April 15, 1930.   P. COBB ET AL   1,754,741
PRESSURE EXERTING ATTACHMENT FOR LAWN MOWER ROLLERS
Filed Feb. 4, 1928
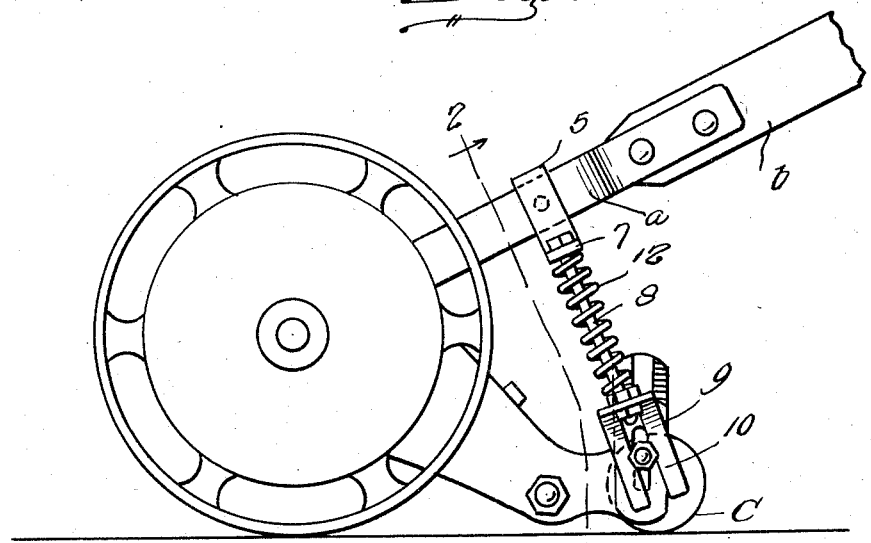
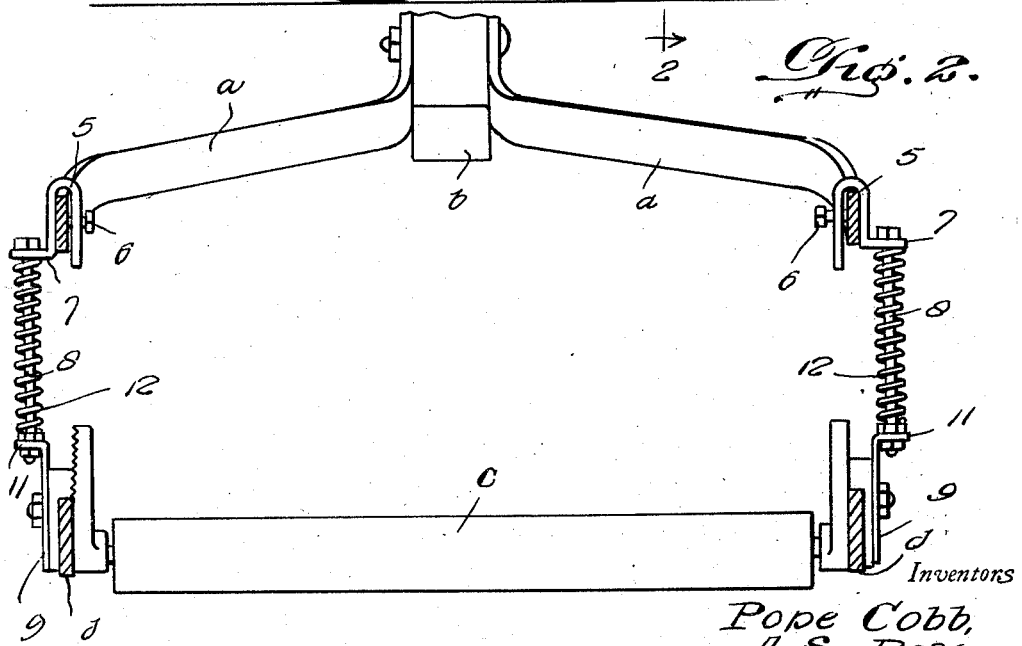
Inventors
Pope Cobb,
A. S. Rose,
By Clarence A. O'Brien
Attorney Patented Apr. 15, 1930

1,754,741

UNITED STATES PATENT OFFICE

POPE COBB AND ARTHUR S. ROSE, OF BROWNSVILLE, TENNESSEE

PRESSURE-EXERTING ATTACHMENT FOR LAWN-MOWER ROLLERS

Application filed February 4, 1928. Serial No. 251,908.

This invention relates to new and useful improvements in attachments for lawn mowers of the hand type and aims to provide means for maintaining pressure upon the usual rear roller of the mower, the purpose thereof being to keep the roller in close engagement with the lawn surface and at the same time to permit flexibility of movement of the roller and to maintain the same from jumping, thus resulting in a much smoother and closer cut of the lawn than would be possible without the present attachment.

One of the most important objects of this invention resides in the provision of such an attachment comprising a pair of generally similar constructed units that may be attached to practically all types of hand lawn mowers without in any manner whatever altering the construction thereof and without affecting the proper operation of the mower.

With the foregoing and other objects in view as the nature of the invention will be better understood, the same comprises the novel form, combination and arrangement of parts hereinafter more fully described, shown in the accompanying drawings and claimed.

In the drawing wherein like reference characters indicate corresponding parts throughout both of the views:

Figure 1 is an end elevation of a conventional hand propelled lawn mower equipped with our improved attachment, and Figure 2 is a fragmentary vertical section through the mower taken substantially upon the line 2—2 of Figure 1 and looking rearwardly in the direction of the arrows.

Now having particular reference to the drawing there is disclosed generally a conventional type of hand propelled lawn mower that includes among numerous other elements the usual handle carrying bars $a$—$a$ attached at their inner ends to the lawn mower frame, and at their outer adjacent ends to the usual propulsion handle $b$. Furthermore the rear lawn engaging roller is disclosed and designated by the reference character $c$, this roller being adjustably mounted at its opposite ends by the usual brackets to the frame bars $d$—$d$. The invention consists of a pair of substantially identically constructed units and a description of one will suffice for both.

Each unit consists of an inverted U-shaped bracket 5 adapted for arrangement over the upper edge of one of the handle carrying bars $a$ slightly forwardly of the propulsion bar $b$, the inner leg of the bracket carrying a set screw 6 whereby it may be rigidly secured to the bar as disclosed in Figure 2.

The outer leg of the said bracket is formed at its end with an outwardly bent tongue 7 through an opening in which is freely slidable an elongated pin 8 headed at its end above said tongue.

Each unit further consists of a metallic plate 9 formed throughout substantially its entire length with a slot 10 opening at the lower end of the plate, said slot being provided for the purpose of permitting the plate to be adjustably secured to the bolt of the adjacent bracket for that end of the roller $c$. The upper end of the plate is formed with an outwardly extending tongue 11 through an opening in which is rigidly secured the lower end of said elongated pin 8. Surrounding the pin between the tongues of the bracket and plate is an expansible coil spring 12 for the purpose of normally forcing downwardly upon the adjacent end of the roller C, and obviously by reason of the two units the said roller will be maintained in tensional engagement with the lawn surface to prevent the bouncing of the same thereby resulting in a smoother cut by the mower.

The tension of the spring 12 may be regulated by the attachment of the pins of the unit to the plates 9 at predetermined points adjacent the lower ends thereof.

Having thus described the invention, what we claim is:

1. An attachment for lawn mowers wherein the lawn mower embodies a roller supporting structure, comprising a pair of inverted substantially U-shaped brackets adapted to be secured over the handle carrying bars of the lawn mower in a rigid manner, a laterally extending tongue formed on the free end of the outermost arm of each of said brackets, additional brackets adapted to be secured adjacent the ends of the lawn mower roller supporting structure, each of said last mentioned brackets being formed at its upper end with a laterally disposed tongue, bolts slidably disposed through the tongue of the U-shaped brackets, the heads of the bolts engaging with the said last mentioned tongues, the threaded ends of said bolts being secured to the laterally disposed tongues of the respective brackets adapted to be carried by the roller supporting structure, and expansible coil springs convoluted about the bolts for disposition between the respective pairs of tongues for exerting a downward pressure on the roller of the lawn mower.

2. An attachment for lawn mowers comprising a pair of inverted substantially U-shaped brackets adapted to straddle the handle carrying bars of the lawn mower and being rigidly secured thereto, a laterally extending tongue formed on the free end of the outermost arm of each of said brackets, a slotted plate adapted to be vertically and adjustably mounted adjacent each end of the lawn mower roller, a laterally extending tongue formed on the upper end of each plate, headed bolts extending through the respective pairs of tongues, the heads of the bolts engaging with the tongues on the said inverted U-shaped brackets, nuts threaded on the threaded ends of the bolts for engagement with the opposite faces of the tongues on the slotted plates, and an expansible coil spring convoluted about each bolt portion for disposition between the respective pairs of tongues for exerting a downward pressure on the lawn mower roller.

In testimony whereof we affix our signatures.

POPE COBB.
ARTHUR S. ROSE.